(No Model.)

2 Sheets—Sheet 1.

E. H. JOHNSON.
ELECTRICAL SWITCH.

No. 339,298. Patented Apr. 6, 1886.

ATTEST:
Edw. C. Rowlands
N. W. Seely

INVENTOR:
Edward H. Johnson
By Rich. N. Dyer,
Atty.

(No Model.) 2 Sheets—Sheet 2.

E. H. JOHNSON.
ELECTRICAL SWITCH.

No. 339,298. Patented Apr. 6, 1886.

ATTEST:
E. C. Rowland
H. W. Fiddle

INVENTOR:
Edward H. Johnson,
By Rich'd N. Dyer,
Atty.

UNITED STATES PATENT OFFICE.

EDWARD H. JOHNSON, OF NEW YORK, N. Y.

ELECTRICAL SWITCH.

SPECIFICATION forming part of Letters Patent No. 339,298, dated April 6, 1886.

Application filed January 8, 1883. Serial No. 81,299. (No model.)

*To all whom it may concern:*

Be it known that I, EDWARD H. JOHNSON, of New York city, in the county and State of New York, have invented a new and useful Improvement in Electrical Circuits, of which the following is a specification.

Heretofore the switches or circuit-controllers used in making and breaking the circuits of multiple-arc systems of electrical distribution have been so formed and arranged as to make or break connection on only one side or pole of a circuit. The disadvantage of this plan is that in case a leak or ground connection occurs on that side of a multiple-arc circuit which is broken beyond the break, and another such ground occurs on the like conductor of the main circuit from which said multiple-arc circuit is derived, a complete circuit through the translating devices is produced; or, if a leak occurs in the conductor which is not broken and in the opposite conductor of the main line, a cross or short circuit will occur, the result in either case being a loss of electrical energy.

The object of my invention is to obviate these difficulties by providing a switch which shall act on both poles of the circuit in which it is placed, so that both are made and broken simultaneously. Where such a switch is used a ground-circuit cannot be formed unless four ground-connections—one on each main conductor and one on each derived conductor—are formed, which event, it is evident, is exceedingly unlikely to ever occur.

My invention therefore consists, first, in the use of a switch which shall control both poles of a circuit, and, secondly, in so constructing such switch that the two poles will be broken simultaneously and by a single movement.

Figure 1:
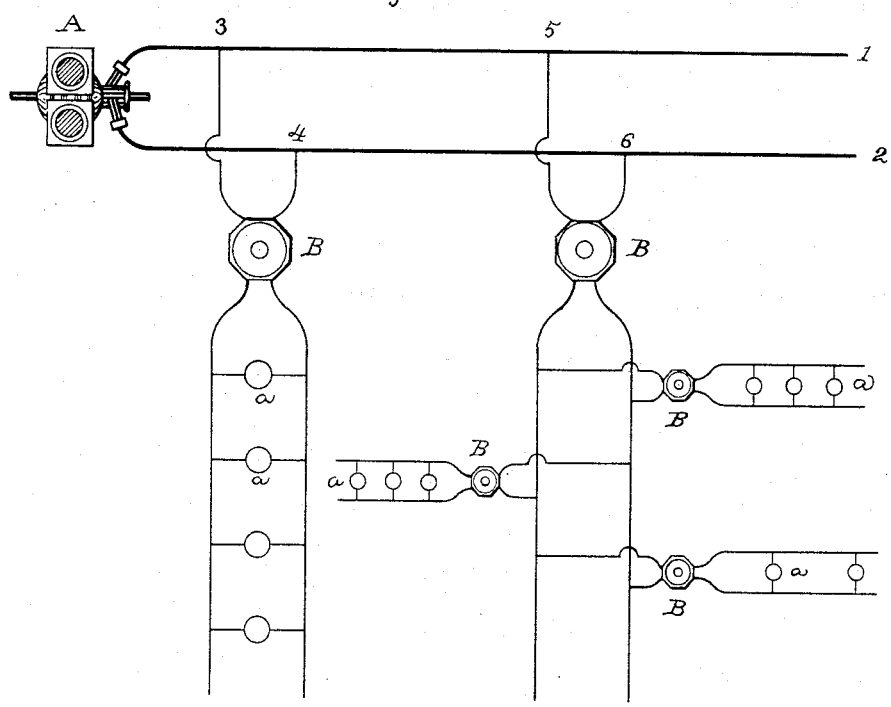
Figure 2:
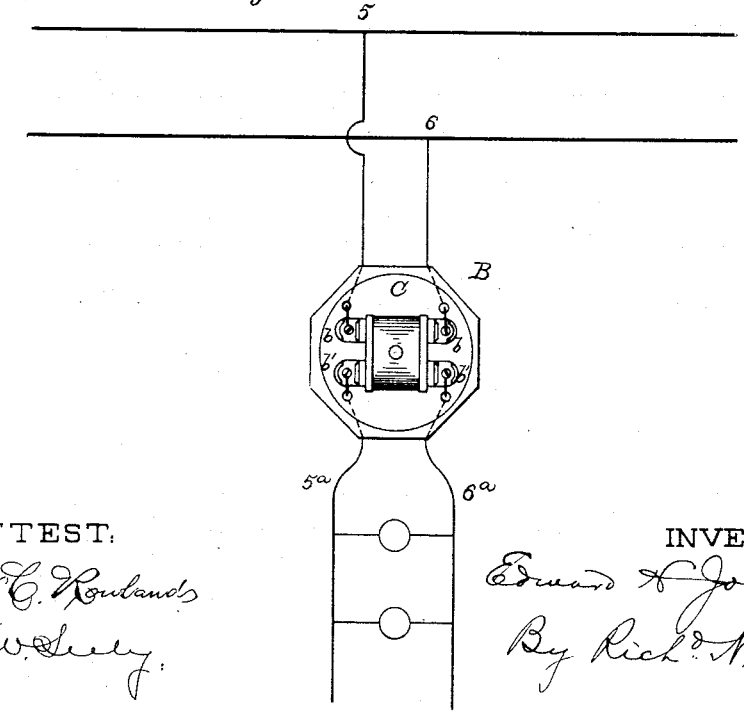
Figure 3:
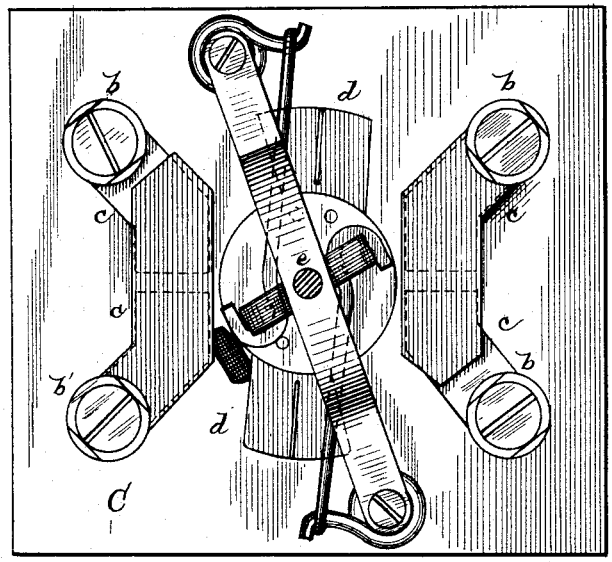
Figure 4:
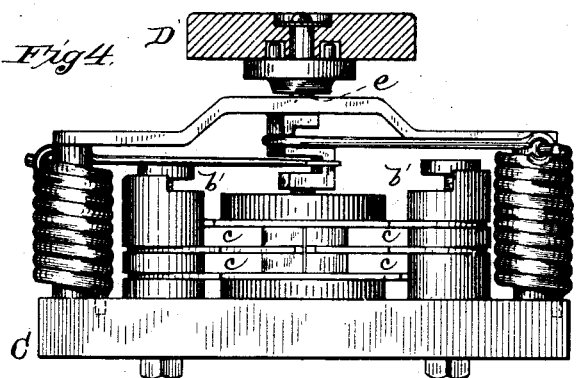
Figure 5:
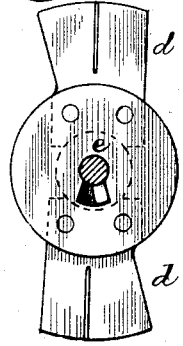
Figure 6:
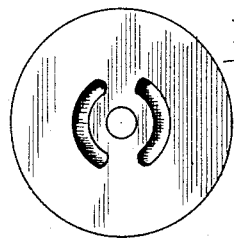

The invention is illustrated in the annexed drawings, in which Figures 1 and 2 are diagrams showing the arrangement of the switch. Fig. 3 is a plan view of a switch which may be employed with the circuit opened, the operating-handle being removed; Fig. 4, an elevation of the same switch with the operating-handle in section and the circuit closed; Fig. 5, a view of the moving contact-piece, and Fig. 6 a bottom view of the handle.

1 2 are main conductors leading from a generator or battery of generators, (represented by A.)

3 4 and 5 6 are multiple-arc circuits leading from the main circuit 1 2, and other multiple-arc circuits containing incandescing electric lamps or other translating devices $a\ a$ are derived from the circuits 3 4 and 5 6.

B, Figs. 1 and 2, represents a switch adapted to open or close both poles of the circuit in which it is placed simultaneously. Taking as an example the circuit 5 6, suppose a switch were used which would break only the wire 5. In this case, if a ground-connection should occur in any part of conductor 1 and another at any point in conductor 5 beyond the switch, or in any wire leading from or connected, however distantly, with said conductor 5, current will pass from conductor 1 to conductor 5, across through translating devices to conductor 6, and thence back to the generator; or, if a ground occurs in conductor 6, or a conductor connected therewith, and also in conductor 1, a short circuit will be formed between conductor 1 and conductor 6, which is connected to conductor 2. If, however, both conductors 5 6 are broken, it is evident that no ground-circuit can occur unless each main conductor 1 2 and each derived conductor 5 6 contains a ground-connection.

Switches B may, as shown, be placed in any of the multiple-arc circuits of the system.

The switch B (shown in Fig. 2) is a typical representation of that shown in detail in Figs. 3, 4, 5, and 6. This is a switch adapted to break both poles of the circuit simultaneously. It has four terminal binding-posts. The wires 5 and 6 are connected with terminals $b\ b$, and wires $5^a$ and $6^a$, which form part of the same circuit, are connected with terminals $b'\ b'$. Each terminal has spring contact-plates $c\ c$ extending from it, and the plates forming part of the same side of the circuit overlap each other.

Pivoted in the center of the apparatus are metal contact-tongues $d\ d$, insulated from each other, but connected mechanically, so as to move together.

D is the operating-handle, upon the spindle $e$, which carries the contact-tongues. The contact-tongues are moved by a spring mechanism controlled by the handle D, which arrangement forms the subject of a separate application for Letters Patent. By this movement the tongues $d\ d$ are forced between the terminal-plates on both sides simultaneously, so as to close at the same time the two sides of the circuit between binding-posts *b b* and binding-posts *b' b'*, and such tongues also are simultaneously withdrawn from the plates, so as to break both sides of the circuit at once.

The terminals and the operating mechanism are all mounted upon a suitable insulating-base, C, preferably of non-combustible material.

The construction of switch shown and thus briefly described is not claimed herein, being claimed in the application above referred to.

The present application relates only to the feature of making and breaking both sides of the circuit.

What I claim is—

1. In a multiple-arc system of electrical distribution, the combination, with a circuit, of a circuit making and breaking device for each side or pole of said circuit, substantially as set forth.

2. In a multiple-arc system of electrical distribution, the combination, with a circuit, of a switch adapted to make or break both sides or poles of the circuit simultaneously and by the same movement, substantially as set forth.

3. In a multiple-arc system of electrical distribution, the combination, with a circuit, of a switch comprising a base, contacts upon such base forming the terminals of the several sides or poles of the circuit, and means carried by said base for connecting the contacts of each side or pole together simultaneously with the connection together of the contacts of the other pole, substantially as set forth.

This specification signed and witnessed this 18th day of December, 1882.

EDWARD H. JOHNSON.

Witnesses:
WM. H. MEADOWCROFT,
H. W. SEELY.